US012737787B2

(12) United States Patent
Ding et al.

(10) Patent No.: US 12,737,787 B2
(45) Date of Patent: Sep. 15, 2026

(54) GENERATING AND ENHANCING DIGITAL VIDEO COMPONENTS

(71) Applicant: Google LLC, Mountain View, CA (US)

(72) Inventors: Ying Ding, Los Altos, CA (US); Yixin Cai, Sunnyvale, CA (US); Prashant Prakashchandra Baheti, Santa Clara, CA (US); Meghana Jayant Deodhar, Sunnyvale, CA (US); Prithvi Prabhakar, Sunnyvale, CA (US); Shushan Chen, Mountain View, CA (US); Fatih Boyaci, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/671,503

(22) Filed: May 22, 2024

(65) Prior Publication Data

US 2024/0394755 A1 Nov. 28, 2024

Related U.S. Application Data

(60) Provisional application No. 63/468,180, filed on May 22, 2023.

(51) Int. Cl.
*G06Q 30/0241* (2023.01)
*G06T 11/60* (2026.01)
(Continued)

(52) U.S. Cl.
CPC .......... *G06Q 30/0276* (2013.01); *G06T 11/60* (2013.01); *G06V 10/70* (2022.01); *G11B 27/031* (2013.01); *G06T 2211/441* (2023.08)

(58) Field of Classification Search
CPC .................................................. G06Q 30/0276
See application file for complete search history.

(56) References Cited

U.S. PATENT DOCUMENTS 10,026,098 B2 7/2018 Meyer et al.
10,182,256 B1 * 1/2019 Kalampoukas ........ G06V 20/41
(Continued)

FOREIGN PATENT DOCUMENTS

CN 114202728 A * 3/2022 ........... G06F 18/214
CN 117115303 A 11/2023

OTHER PUBLICATIONS

T. Takahashi, M. Sugano, K. Hoashi and S. Naito, "Arbitrary product detection from advertisement video by using object independent features," 2011 IEEE International Conference on Multimedia and Expo, Barcelona, Spain, 2011, pp. 1-6, doi: 10.1109/ICME.2011.6011922 (Year: 2011).*
(Continued)

*Primary Examiner* — Ilana L Spar
*Assistant Examiner* — Melinda Gieringer
(74) *Attorney, Agent, or Firm* — Lerner David LLP

(57) ABSTRACT

The technology is directed to artificial intelligence (AI) powered tools that can enhance existing digital video components and simplify and automate the creation of new digital video components. The technology includes a digital video component creation tool that leverages existing assets to generate digital video components, a voice-over tool that can add voice-overs, generated from text to video components, and a video component evaluation tool that can evaluate video components for conformity with attributes associated with metrics for video creatives.

20 Claims, 9 Drawing Sheets

(51) Int. Cl.
*G06V 10/70* (2022.01)
*G11B 27/031* (2006.01)

(56) References Cited

U.S. PATENT DOCUMENTS

| | | | | |
|---|---|---|---|---|
| 11,392,643 | B2 | 7/2022 | Guillen et al. | |
| 11,589,116 | B1 * | 2/2023 | Omar | G06V 20/44 |
| 2009/0234940 | A1 * | 9/2009 | Pal | H04L 65/80<br>709/224 |
| 2017/0154415 | A1 * | 6/2017 | Aydin | H04N 17/004 |
| 2017/0372165 | A1 * | 12/2017 | Jouhikainen | G06N 3/0464 |
| 2019/0180108 | A1 * | 6/2019 | Catalano | H04N 21/812 |
| 2020/0042610 | A1 * | 2/2020 | Boles | H04N 1/6027 |
| 2021/0034878 | A1 * | 2/2021 | Deng | G06F 18/254 |
| 2021/0182947 | A1 * | 6/2021 | Wade | G06Q 30/0631 |
| 2023/0410793 | A1 * | 12/2023 | Clifton | G06N 3/045 |
| 2024/0203146 | A1 * | 6/2024 | Strugo | G06V 20/49 |
| 2024/0256592 | A1 * | 8/2024 | O'Neill | G06V 20/49 |
| 2024/0290093 | A1 * | 8/2024 | Boiarov | G06V 20/70 |

OTHER PUBLICATIONS https://blog.google/products/ads/put-bow-on-your-holiday-app-marketing/ (Printed: May 22, 2023; Published: Nov. 22, 2016).

Anderson, M., "Weights in Machine Learning", Jan. 12, 2023, https://blog.metaphysic.ai, 7 pages.

Korzhov, D., "AI Marketing Campaigns: The Future of Advertising in 2024", Feb. 2, 2024, [online] [retrieved Mar. 11, 2024]. Retrieved from the Internet: <URL:http://improvado.io/blog/ai-marketing-campaigns> 19 pages.

Forristal, L., "Amazon's new generative AI tool lets advertisers enhance product images", Oct. 25, 2023, [online] [retrieved Mar. 11, 2024]. Retrieved from the Internet: <URL:http://techcrunch.com/2023/10/25/amazons-new-generative-ai-tool-lets-advertisers-enhance-product-images/>, 8 pages.

* cited by examiner

FIG. 2
Organic, local,
homemade, crispy
110
112
118
132

GENERATING AND ENHANCING DIGITAL VIDEO COMPONENTS

CROSS-REFERENCE TO RELATED APPLICATION

This application claims the benefit of the filing date of U.S. Provisional Patent Application No. 63/468,180, filed May 22, 2023, the disclosure of which is hereby incorporated herein by reference.

BACKGROUND

Digital video components are generally more complex and more challenging to create compared to text or image components. In this regard, video components generally require more time and expenses to create and produce than text or image components. For instance, video components must account for numerous different devices and formats through which the video component will be displayed. Each device and format may have its own unique set of challenges. For example, video components that are intended for television have different requirements than video components that are intended for social media. Additionally, video ads that are created for mobile devices have different requirements than video ads that are created for desktop computers, televisions, or other larger displays.

Small and medium-sized businesses (SMBs) often struggle with creating effective video components because they typically have limited budgets and resources, which makes it difficult to produce high-quality video components that target different devices and formats. Additionally, SMBs often lack the expertise and experience necessary to create effective video components or the resources to hire someone who does. Thus, video components produced by SMBs may not be as effective as those created by those with the proper resources and experience.

BRIEF SUMMARY

The technology described herein is directed to artificial intelligence (AI) powered tools that can enhance existing digital video components and simplify and automate the creation of new digital video components. The technology includes a digital video component creation tool that leverages existing assets to generate digital video components, referred to herein as video components. The technology may also include a voice-over tool that can add voice-overs, generated from text, to video components. The technology may also evaluate video components for conformity with attributes associated with best practices for video creatives so the video components may be edited to increase their effectiveness.

The technology described herein may assist creators, such as SMBs with the creation and revision of video components to reduce the time, expenses, and technical hurdles typically encountered when producing high-quality, effective video components. In this regard, creators, such as those associated with SMBs or advertisers, may focus on the creative aspects of the video components as opposed to learning and tinkering with the technical tools needed to create the video components. Moreover, creators who use the tools described herein can be confident that the video components they create will be effective, as they will conform with effective industry practices. The technology may also automatically generate videos tailored to viewers and conformant with the preferences of the SMB or advertisers.

One aspect of the disclosure is directed to a method for generating a video component. The method may include receiving, by one or more processors, a set of assets associated with an entity or product; determining, by the one or more processors, characteristics associated with the entity or product; and generating, by the one or more processors, the video component using a subset of the set of assets and the determined characteristics.

In some instances, the set of assets includes one or more text, logos, images, audio, or videos.

In some instances, the determined characteristics include one or more of a color or a font associated with the entity or product.

In some instances, the subset is determined by a representation engine.

In some instances, the determined characteristics are determined by a characteristic engine.

In some instances, the method further comprises determining a personality associated with the entity or product, wherein generating the video component includes using the determined personality. In some examples, the determined personality is determined by a personality engine.

In some instances, the video component is generated by a creation engine.

Another aspect of the disclosure is directed to a method for assessing a video component, the method comprising: receiving, by one or more processors, the video component; evaluating, by the one or more processors, using a video component evaluation tool, the received video component relative to one or more metrics, the evaluation determining whether each of the one or more metrics are met by the received video component; and outputting, by the one or more processors, a result indicating whether the one or more metrics are met based on the evaluation.

Another aspect of the disclosure is directed to a system comprising: one or more processors, the one or more processors configured to: receive a video component; evaluate, using a video component evaluation tool, the received video component relative to one or more metrics, the evaluation determining whether each of the one or more metrics are met by the received video component; and output a result indicating whether the one or more metrics are met based on the evaluation.

In some instances, the video component evaluation tool includes a component guidance system, wherein the component guidance system includes one or more of a logo detection engine, an audio annotation engine, an audio transcript engine, a promotion engine, or a product/brand engine.

In some instances, the logo detection engine is configured to detect logos within the video component, and wherein the result includes an indication of whether the logo detection engine detects one or more logos.

In some instances, the audio annotation engine is configured to detect audio annotations within an audio track of the video component, wherein the result includes an indication of whether the audio annotation engine detects one or more predefined audio annotations comprising pieces of music or voice, lengths of music or voice, or music or voice having a particular volume.

In some examples, the audio transcript engine is configured to detect keywords from a taxonomy based on a transcript of an audio track of the video component, wherein the result includes an indication of whether the audio annotation engine detects one or more predefined audio annotations comprising pieces of music or voice, lengths of music or voice, or music or voice having a particular volume.

In some examples, the promotion engine is configured to detect promotions within a transcript of an audio track of the video component, wherein the result includes an indication of whether the promotion engine detects one or more promotions within the transcript.

In some examples, the product/brand engine is configured to use visual recognition algorithms to detect mentions of brands and/or products within the video component, wherein the result includes an indication of the brands and/or products detected by the product/brand engine.

In some instances, the received video component is analyzed to identify and summarize attributes within the video component.

In some examples, the attributes include one or more of content within the received video component or one or more visual elements within the received video component.

In some examples, the one or more visual elements include at least one of duration of the received video content, aspect ratio of the received video content, or visual effects within the received video content.

Another aspect of the disclosure is directed to system comprising one or more processors and/or computing devices. The system may be configured to receive a set of assets associated with an entity or product; determine characteristics associated with the entity or product; and generate the video component using a subset of the set of assets and the determined characteristics.

Another aspect of the disclosure is directed to a method for overlaying a narration on a video component, the method comprising: receiving, by one or more processors, a video component; receiving, by the one or more processors, input text and parameters; generating, by the one or more processors, a narration of the input text based on the parameters; overlaying, by the one or more processors, the narration on the video component; leveling, by the one or more processors, a level of volume of the narration relative to other audio in the video component; and outputting, by the one or more processors, the video component with the narration.

Another aspect of the disclosure is directed to a system comprising one or more processors and/or computing devices. The system may be configured to receive a video component; receive input text and parameters; generate a narration of the input text based on the parameters; overlay the narration on the video component; level a level of volume of the narration relative to other audio in the video component; and output the video component with the narration.

Another aspect of the disclosure is directed to a method for assessing a video component for compliance with industry practices. The method may include receiving, by one or more processors, the video component; evaluating, by the one or more processors, using a video component evaluation tool, the received video component relative to the industry practices; and outputting, by the one or more processors, a result based on the evaluation.

In some instances, the video component evaluation tool includes a component guidance system.

In some instances, the component guidance system includes one or more of a logo detection engine, an audio annotation engine, an audio transcript engine, a promotion engine, or a product/brand engine.

In some instances, the logo detection engine is configured to detect logos within the video component.

In some instances, the audio annotation engine is configured to detect audio annotations within an audio track of the video component.

In some instances, the audio transcript engine is configured to detect keywords from a taxonomy based on a transcript of an audio track of the video component.

In some instances, the promotion engine is configured to detect promotions within a transcript of an audio track of the video component.

In some instances, the product/brand engine is configured to use visual recognition algorithms to detect mentions of brands and or products within the video component.

Another aspect of the disclosure is directed to a system comprising one or more processors and/or computing devices. The system may be configured to receive the video component; evaluate, using a video component evaluation tool, the received video component relative to the industry practices; and output a result based on the evaluation.

DETAILED DESCRIPTION

This technology generally relates to tools that leverage artificial intelligence ("AI"), including machine learning and generative AI, to assist with the creation and enhancement of digital video components. The tools may include creation tools, including a video component creation tool that leverages existing components to generate new video components. The tools may also include enhancement tools, such as a voice-over tool, which can alter the content of a video component. In this regard, the voice-over tool may add voice-overs, generated from inputted text to video components. The tools may also include evaluation tools that determine how well video components conform with attributes associated with best practices for video creatives so the video components may be edited to increase their effectiveness. The evaluation tools may include a video component evaluation tool, described in detail herein.

The tools may be applications, such as a web-based application provided to a client device from a server or a standalone application executing on the client device, or frameworks which may be incorporated into other applications. Moreover, although the tools are described individually herein, each tool may be combined into a single application or framework, or otherwise be implemented in conjunction with other tools within a single application or framework. For instance, an application may include some or all the features of the video component creation tool, the voice-over tool, and the video component evaluation tool. In another example, an application or framework may include the voice-over tool. Further, the tools may be implemented in individual frameworks or applications which may be packaged together. For instance, an application may include the voice-over tool and the video component evaluation tool.

Although each of the tools described herein is categorized as a creation tool, enhancement tool, or evaluation tool, these categorizations are merely for explanation and reference purposes. Each tool is not limited to the functions of the category to which they are assigned in this disclosure. For instance, the video component creation tool may create video components, enhance the created video components, and evaluate the created video components, thereby satisfying each of the three categories.

Creation

Figure 1:
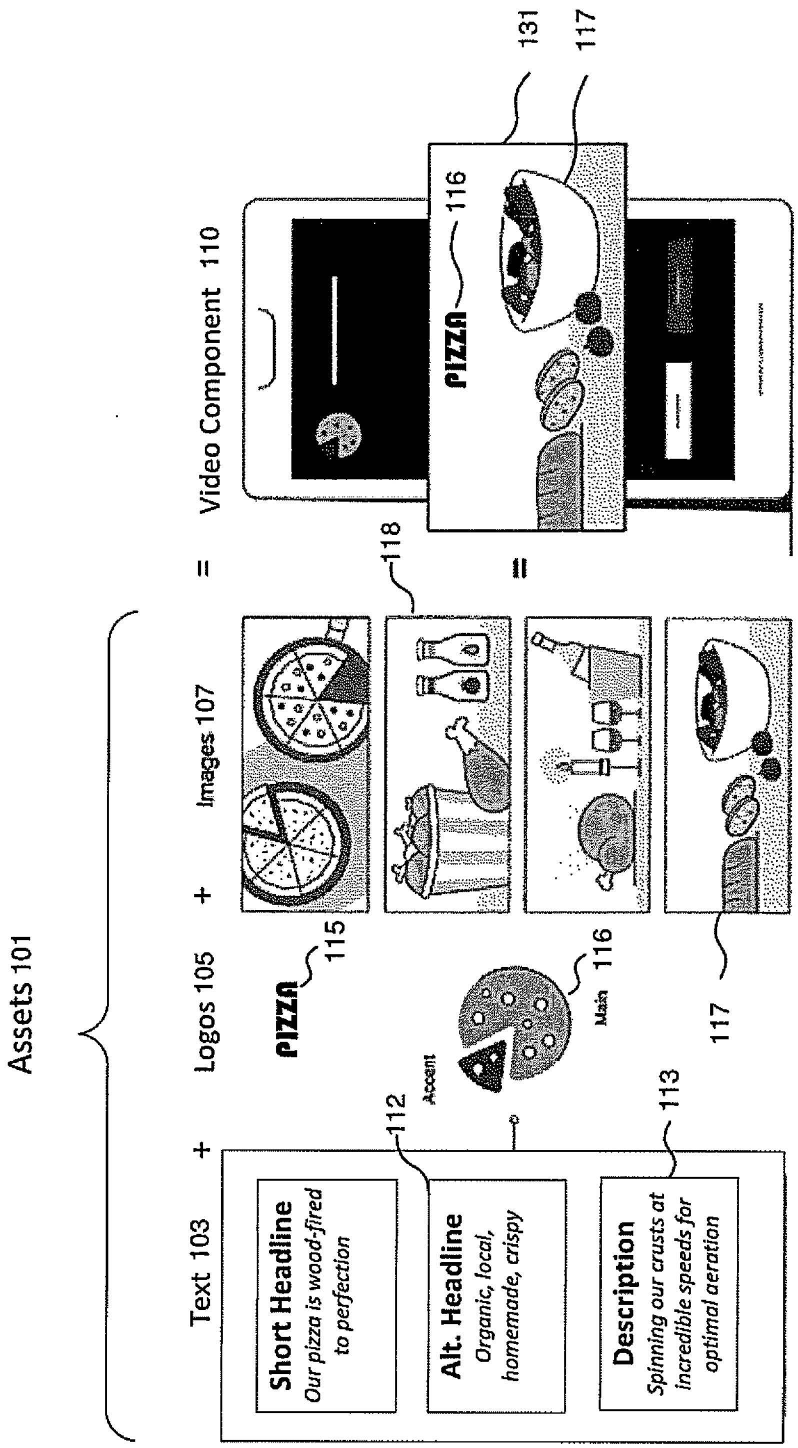
FIG. 1 is an example illustration of a video component generated from a set of assets, in accordance with aspects of the disclosure.

The video component creation tool may leverage existing assets to generate new video components. Assets may include text, logos, images, videos, etc., and other such multimedia. As illustrated in FIG. 1, the assets 101 of a pizza business include text 103, logos 105, and images 107. It should be understood that assets 101 are non-limiting examples, and other types of assets may be included, including audio assets. Further, any number of assets may be included. In this regard, although FIG. 1 illustrates three text assets, two logos, and four images, the assets may include fewer or more text, logo, image, audio, etc., assets.

In operation, the video component creation tool may analyze the assets to identify a subset of assets that may be included in a new video component, such as an advertisement for a business, entity, etc. For instance, as illustrated in FIG. 1, the video component creation tool may identify assets 101 to identify a subset of the assets to include in the new video component 110.

The subset of assets may be those determined to satisfy certain criteria, such as being representative of the business, company, individual(s), non-profit, or other such entity the video component is being generated for. For instance, the video component creation tool may determine a subset of assets from assets 101 corresponding to a pizza business entity, including descriptions 112, 113, logos 115, 116, and images 117, 118 that may be included in a generated new video component.

The video component creation tool may combine some or all of the subset of assets into a new video component. For instance, and as further illustrated in FIG. 1, the subset of assets including description 113, logo 116, and image 117 are integrated into frame 131 of video component 110. In this regard, video component 110 includes a horizontally oriented video including frame 131 having the logo 116 overlaid on image 117. Although video component 110 is horizontally oriented, the video component creation cool may generate video components in any format or orientation. For example, the video component creation tool may generate video components in a vertical orientation or different aspect ratios. In some instances, the video component creation tool may create the same video component in different orientations and/or aspect ratios for deployment across different devices and mediums, such as TV, mobile, web, etc.

Although not shown, the video component creation tool may generate a voiceover of description 113 that plays back with the video component 110. Alternatively, or additionally, the video component creation tool may overlay the description 113 itself over an image, such as one of images 107, a logo, such as logo 115 or 116, or another image or video, such as a stock video or image available to the video component creation tool.

In some instances, the video component creation tool may analyze the assets of an entity to determine characteristics of the entity, such as the entity's color(s) and/or font(s). Moreover, the video component creation tool may analyze the assets to determine the entity's "personalities," such as sincere, authentic, competent, exciting, sophisticated, rugged, etc. Such characteristics and personalities may be incorporated into generated video components for the entities.

Figure 2:
FIG. 2 is an example illustration of a video component generated in accordance with aspects of the disclosure.

For example, the video component creation tool may analyze assets 101 and determine the pizza business has an "authentic personality" and a font as used in logo 115. The video component creation tool may generate one or more frames in the video based on the determined personality and characteristics. For example, FIG. 2 illustrates a frame 132 of the video component 110 created by the video component creation tool for the pizza business. Frame 132 includes text 112 overlaid on image 118. The text 112 has been formatted in the font of the logo 115 which was identified as a font associated with the pizza business. The video component creation tool included text 113 since it represents the "authentic personality" of the pizza business.

Although the two frames 131, 132 of video component 110 illustrate a subset of assets selected from assets 101, a video component may include any number of assets. The order of the assets within the video component and the length of time each asset is displayed or otherwise played back in the video component may also be determined by the video component creation tool and/or based on input from a user.

The assets may be stored in one or more databases or may be uploaded at the time the video component creation tool generates a new video component. For instance, the video component creation tool may retrieve assets from web resources such as web pages, app store landing pages, etc., associated with the entity for which the new video component is being generated. Additionally, or alternatively, a user may upload assets to the video component creation tool or a location accessible by the video component creation tool, such as a database.

As described herein, assets may include text, logos, images, videos, etc., and other such multimedia. Although assets are described as being one piece of multimedia, such as a text or a logo, a piece of multimedia can include more than one asset. For instance, a piece of multimedia, such as a logo, may include assets including the logo itself, as well as the text of the logo. In another example, a video asset may include any number of image assets, logo assets within the image assets, audio assets within the video asset, and text within the video asset. In some instances, assets contained within other assets may be identified, stored, and/or otherwise retrieved by artificial intelligence models trained to identify particular asset types, visual and textual recognition algorithms, etc.

The asset creation tool may identify a subset of assets to include in a video component, determine the characteristics and personality of an entity, and generate video components using machine learning models. These machine learning models can be implemented in a system, such as an asset analysis and component generation system (AACGS.) The AACGS may be implemented as part of the asset creation tool. Alternatively, or additionally, some of the AACGS may be implemented as a separate program(s) or system(s) from the asset creation tool.

Figure 3:
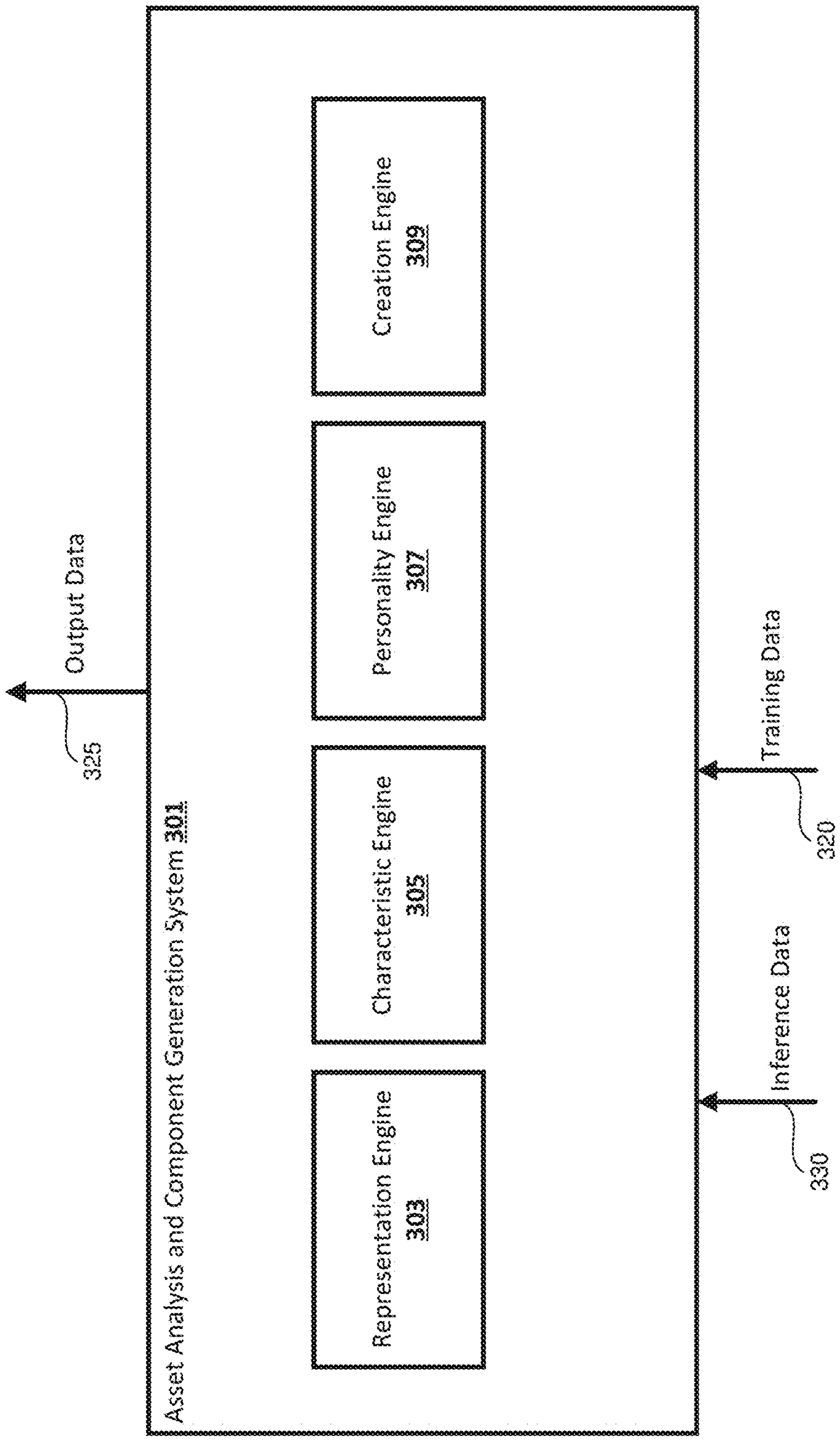
FIG. 3 is a block diagram of an example asset analysis and component generation system, in accordance with aspects of the disclosure.

FIG. 3 depicts a block diagram of an example asset analysis and component generation system (AACGS) 301, which can be implemented on one or more computing devices. The AACGS 301 can be configured to receive inference data 330 and/or training data 320 for use in identifying subsets of assets to include in video components, determining characteristics and personalities of entities, and/or generating video components. For example, the AACGS 301 can receive the inference data 330 and/or training data 320 as part of a call to an application programming interface (API) exposing the AACGS to one or more computing devices. Inference data 330 and/or training data 320 can also be provided to the AACGS 301 through a storage medium, such as remote storage connected to the one or more computing devices over a network. Inference data 330 and/or training data 320 can further be provided as input through a user interface on a client computing device coupled to the AACGS 301. The inference data 330 can include the assets associated with the entity for which the video component creation tool is generating a new video component.

The AACGS 301 can include one or more engines, also referred to herein as modules and/or models, configured to identify subsets of assets to include in video components, determine characteristics and personalities of entities, and/or generate video components. In this regard, AACGS 301 includes representation engine 303, characteristic engine 305, personality engine 307, and creation engine 309. The representation engine 303 may be trained to identify subsets of assets to include in video components. The characteristic engine 305 may be trained to determine characteristics associated with an entity. The personality engine 307 may be trained to determine the personality of an entity. The creation engine 309 may be trained to generate video components from a collection of assets for an entity.

Engines 303-309 may be implemented as one or more computer programs, specially configured electronic circuitry or any combination thereof. Although FIG. 3 illustrates the AACGS 301 as having four engines, including a representation engine 303, characteristic engine 305, personality engine 307, and creation engine 309, the AACGS 301 may have any number of engines. Moreover, the functionality of the engines described herein may be combined within one or more engines. For instance, the functionalities of the characteristic engine 305 and personality engines 307, including determining characteristics associated with an entity and determining the personality of an entity, respectively, may be handled by a single engine trained to do both functions. Although engines 303-309 are all shown as being in a single AACGS 301, the engines may be implemented in more than one AACGS.

Moreover, engines 303-309 may work in tandem and/or cooperatively. For instance, the characteristic engine 305 and personality engine 307 may provide outputs to the representation engine 303 for use in selecting assets to include in a video component. The representation engine, in turn, may provide the selected assets to creation engine 309 for generating a video component.

The training data 320 can correspond to an artificial intelligence (AI) or machine learning (ML) task for identifying subsets of assets to include in video components, determining characteristics and personalities of entities, generating video components, and other such tasks performed by engines 303-309. The training data 320 can be split into a training set, a validation set, and/or a testing set. An example training/validation/testing split can be an 80/10/10 split, although any other split may be possible. The training data for the representation engine 303 can include examples of assets that have been selected and not selected for inclusion in video components previously. The training data for the characteristic engine 305 may include assets including and not including characteristics of entities. The training data for the personality engine 307 may include assets that have and do not have traits associated with particular entity personalities. The training data for generating video components may include previously created video components and, in some instances, data defining where, when, and/or how assets were incorporated into the previously created video components.

The training data 320 can be in any form suitable for training an engine, according to one of a variety of different learning techniques. Learning techniques for training an engine can include supervised learning, unsupervised learning, and semi-supervised learning techniques. For example, the training data 320 can include multiple training examples that can be received as input by an engine. The training examples can be labeled with a desired output for the engine when processing the labeled training examples. For instance, and with reference to training data for determining which assets to include in a generated video component, assets that have been previously selected for inclusion in a video component may be labeled as such, whereas assets not selected for inclusion in a video component may be labeled as such.

The label and the engine output can be evaluated through a loss function to determine an error, which can be backpropagated through the engine to update weights for the engine. For example, if the machine learning task is a classification task corresponding to determining characteristics of an entity, the training examples can be images labeled with one or more classes categorizing characteristics depicted in provided assets. As another example, a supervised learning technique can be applied to calculate an error between outputs, with a ground-truth label of a training example processed by the engine. Any of a variety of loss or error functions appropriate for the type of task the engine is being trained for can be utilized, such as cross-entropy loss for classification tasks, or mean square error for regression tasks. The gradient of the error with respect to the different weights of the candidate engine on candidate hardware can be calculated, for example using a backpropagation algorithm, and the weights for the engine can be updated. The engine can be trained until stopping criteria are met, such as a number of iterations for training, a maximum period of time, a convergence, or when a minimum accuracy threshold is met.

From the inference data 330 and/or training data 320, the AACGS 301 can be configured to output one or more results related to identifying subsets of assets to include in video components, determining characteristics and personalities of entities, and/or generating video components, generated as output data 325. As an example, the output data 325 can be any kind of score, classification, or regression output based on the input data that is output by engines 303-309. Correspondingly, the AI or machine learning task can be a scoring, classification, and/or regression task for predicting some output given some input.

These AI or machine learning tasks can correspond to a variety of different applications in processing images, video, text, speech, or other types of data to identify subsets of assets to include in video components, determine characteristics and personalities of entities, and/or generate video components. The output data 325 can include instructions associated with these tasks. For instance, the creation engine 309 may be configured to provide the output data 325 as a set of computer-readable instructions, such as one or more computer programs, which can be executed by a computing device to generate a video component with the selected assets and features determined by the creation engine 309. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement the functionality described herein, for example, as performed by a system, engine, module, or model. The AACGS 301 can further be configured to forward the output data to one or more other devices configured for translating the output data into an executable program written in a computer programming language. The AACGS 301 can also be configured to send the output data to a storage device for storage and later retrieval. Additionally, or alternatively, the asset creation tool may be configured to receive the output of the AACGS 301 for further processing and/or implementation.

Enhancement

Many video components include narrations played over a video. These narrations, commonly referred to as "voice-overs," may be used to provide verbal descriptions, details, promotions, etc., of an entity or product to a video component. However, producing a voice-over can be difficult and expensive, as special recording equipment and talent are generally required. An automated voice-over tool that converts text to narration, as described herein, may be used to address these issues. The voice-over tool may receive typed text and use a generative AI model to create a narration that can play over the video of the video component.

Figure 4:
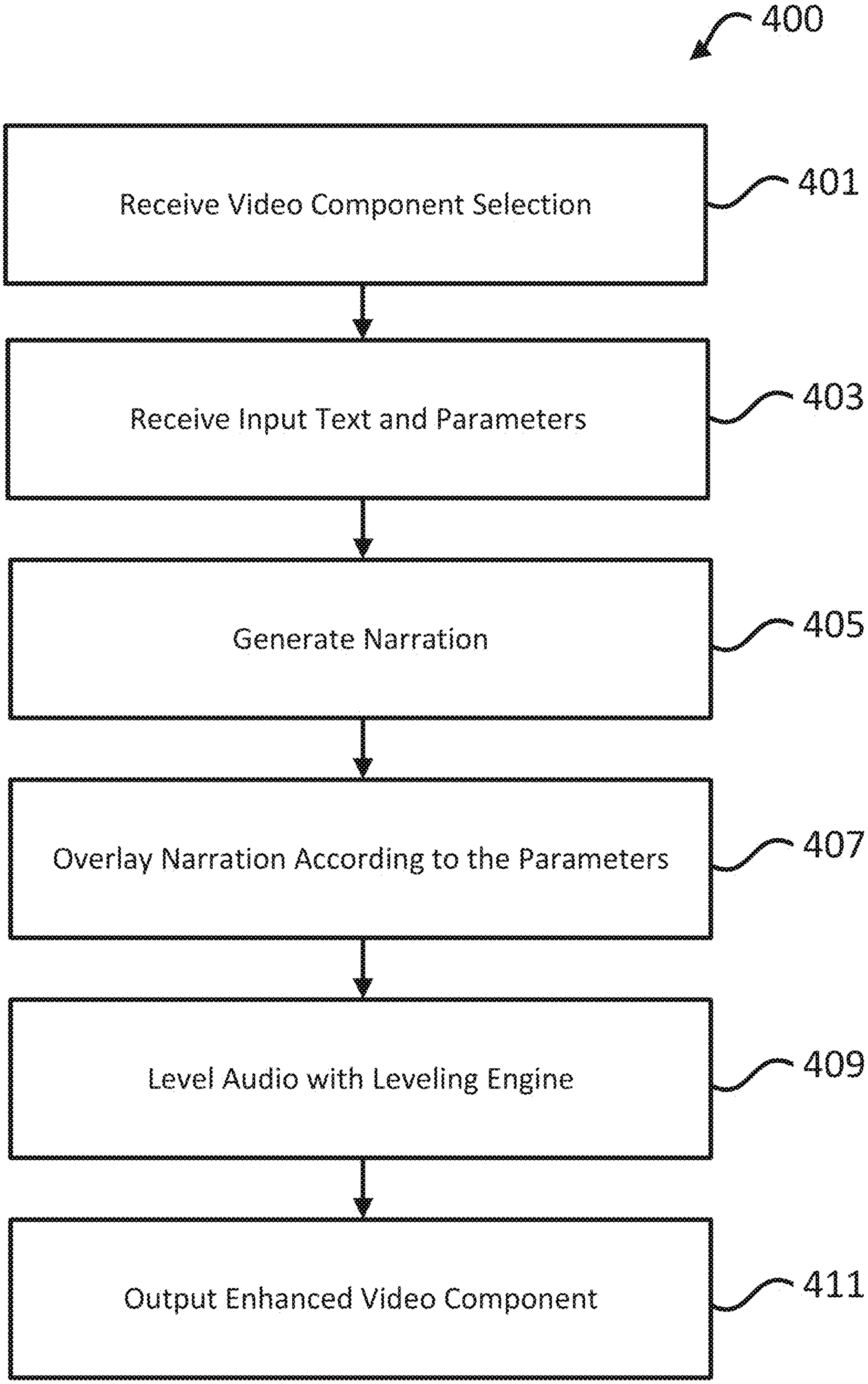
FIG. 4 is a flow diagram of an example process for setting an audio level for a narration on a video component, according to aspects of the disclosure.

FIG. 4 is a flow diagram illustrating the process 400 of the voice-over tool incorporating a voice-over with a video component. The example process can be performed, at least in part, on a system of one or more processors in one or more locations, such as servers 802 of FIG. 8. The following operations do not have to be performed in the precise order described below. Rather, various operations can be handled in a different order or simultaneously, and operations may be added or omitted.

As shown in block 401, the voice-over tool may receive a selection of a video component. Selection of the video component may include, for example, receiving a user input selecting an available video component, or receiving an upload of a video component. The video component may include audio and video.

As shown in block 403, the voice-over tool may receive input text and parameters. The input text may be the text the user wants to be narrated over the video component. The parameters may include a start time of the narration setting when the narration will start playing in the generated video component, a voice type for the narration (e.g., English-US, English-UK, English-AU, French, Spanish, etc.), the language of the narration, etc. The voice-over tool may generate a narration of the inputted text according to the input parameters, as shown by block 407.

The generated voice-over may then be automatically leveled relative to other audio of the video component, such as by a leveling engine, as illustrated by block 409. The leveling engine, which may be compared to engines 301-309, may set the volume level of the narration and the volume level of the audio within the video component. The volume level of the narration relative to the audio within the video component set by the leveling engine may be such that the narration can be easily heard by a listener over the audio within the video component. In this regard, the leveling engine may increase and/or decrease the volume of the narration and/or audio within the video component to achieve an appropriate balance.

The leveling engine may be trained using the techniques described herein to determine an appropriate volume level for the narration relative to audio within the video component. The training data used to train the leveling engine may include labeled video components having and not having appropriate narration volume levels relative to the audio within the video component.

The voice-over tool may output an enhanced video component, including the narration overlaid on the video component at the appropriate level, determined by the leveling engine, and in accordance with the parameters, as shown in block 411.

Evaluation

SMBs and other such users that create video components without sufficient experience or expertise may create ineffective video components, as they may not conform with performance metrics or industry practices, also referred to herein as metrics. A video component evaluation tool, as described herein, may be used to analyze video components for compliance with industry practices. The video component evaluation tool may provide feedback, such as recommendations for improving the video component so that it would better comply with industry metrics and/or verifications of metrics the video component meets.

Figure 5:
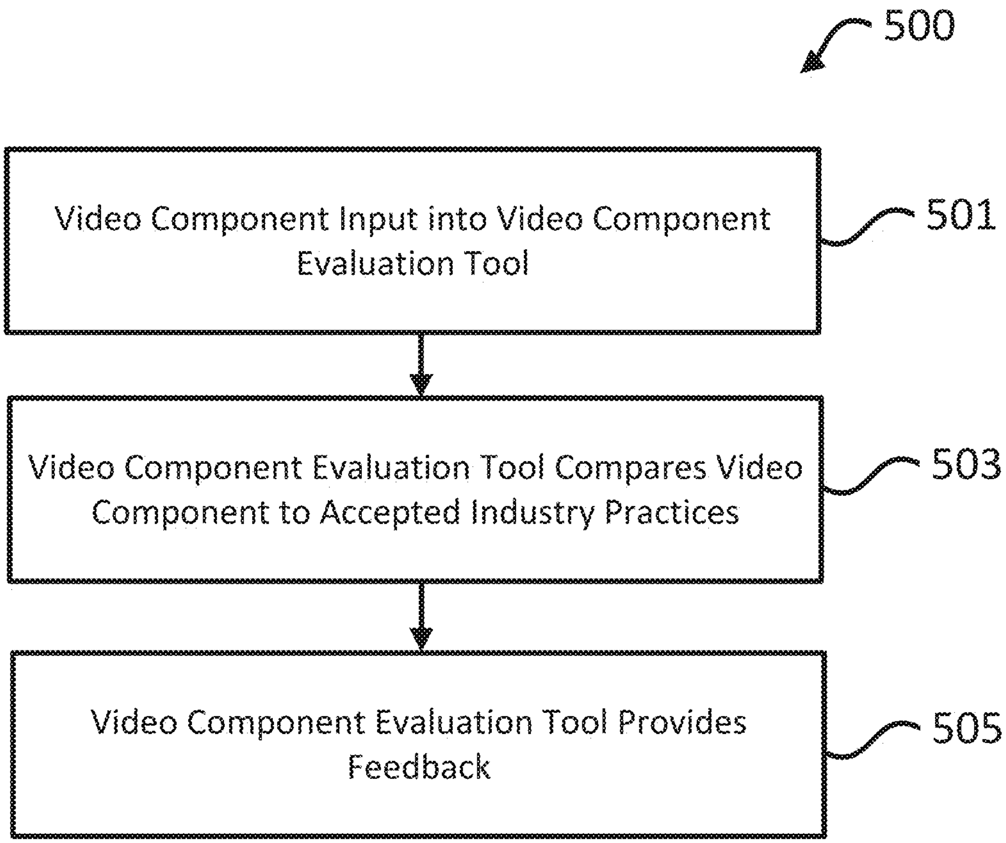
FIG. 5 is a flow diagram of an example process for evaluating a video component for compliance with industry practices, in accordance with aspects of the disclosure.

FIG. 5 is a flow diagram illustrating the process 500 of the video component evaluation tool analyzing video component for compliance with industry practices. The example process 500 can be performed, at least in part, on a system of one or more processors in one or more locations, such as servers 802 of FIG. 8. The following operations do not have to be performed in the precise order described below. Rather, various operations can be handled in a different order or simultaneously, and operations may be added or omitted.

As shown in block 501, the video component evaluation tool may receive a video component for analysis. The video component provided to the video component evaluation tool may be provided by, for example, a user selecting an available video component, or an upload of a video component being retrieved or input into the video component. The video component may include audio and video.

The video component evaluation tool may compare the video component to industry practices to identify compliance of the video component with the industry practices, as shown in block 503. The video component evaluation tool may provide feedback, such as recommendations for improving the video component so that it would better comply with industry practices and/or verifications or confirmations of industry practices the video component meets, as shown in block 505.

The video component evaluation tool may analyze video components for compliance with industry practices using machine learning models. These machine learning models can be implemented in a system, such as a component guidance system (CGS.) The CGS may be implemented as part of the video component evaluation tool. Alternatively, or additionally, some of the CGS may be implemented as a separate program(s) or system(s) from the video component evaluation tool.

Figure 6:
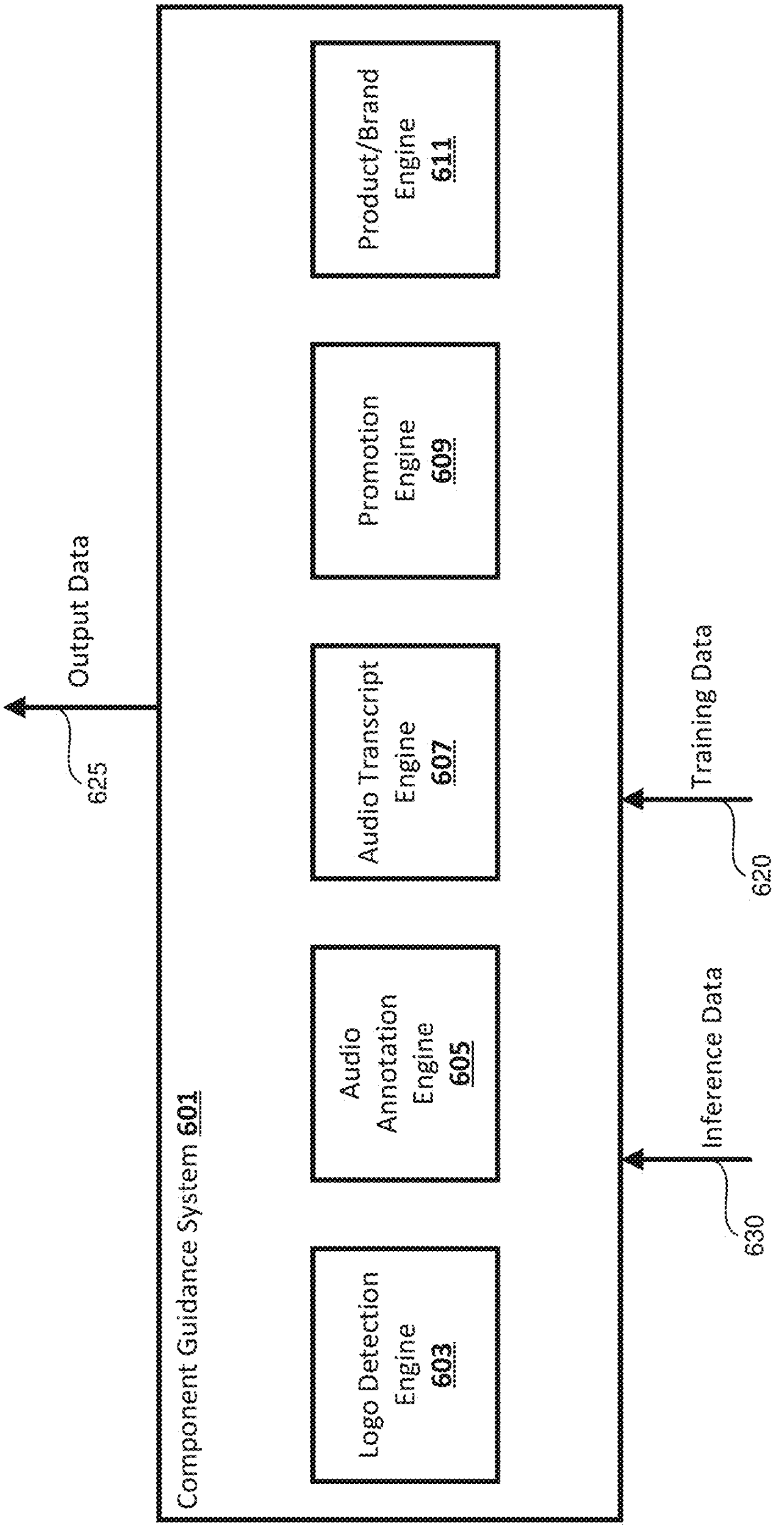
FIG. 6 is a block diagram of an example component guidance system, in accordance with aspects of the disclosure.

FIG. 6 depicts a block diagram of an example a component guidance system 601, which can be implemented on one or more computing devices. The CGS 601 can be configured similarly to AACGS 301. In this regard, CGS 601 may be configured to receive inference data 630 and/or training data 620 for use in analyzing video components for compliance with industry practices.

The CGS 601 can include one or more engines configured to analyze video components for compliance with industry practices. In this regard, CGS 601 includes logo detection engine 603, audio annotation engine 605, audio transcript engine 607, promotion engine 309, and product/brand engine 611.

The logo detection engine 603 may be trained to identify logos of brands, products, entities, etc., within a video component. In this regard, the logo detection engine may use pixel-level image models to analyze video frames of the video component using object recognition and matching the identified objects in the frame to images of logos in a taxonomy of brand logos. The predictions may be aggregated from frames in the video to a video-level signal.

The audio annotation engine 605 may be trained to identify music, voice, and other audio annotations within a video component. In this regard, audio models may operate on the audio track within the video component to detect these attributes (e.g., music, voice, and other such annotations.) The attributes may be predefined, such that the audio annotation engine 605 may be trained to identify particular pieces of music or voice, length of music or voice, volume of music or voice, etc.

The audio transcript engine 607 may be trained to detect mentions of brands, entities, products, etc., within audio of the video component. In some instances, the audio transcript engine 607 may also be trained to detect "calls-to-action" (CTAs) (e.g., "buy now," "Memorial Day sale," etc.), within the audio of the video component. The audio transcript engine 607 may apply automatic speech recognition (ASR) to video components to generate an ASR transcript of the video component. The audio transcript engine 607 may apply keyword matching techniques to the ASR transcript text of the video to detect the presence of keywords from a taxonomy of brands, products, entities, CTAs, etc. In some instances, large language models (LLMs) may be used to automatically expand a human curated list of keywords. In some examples, the audio transcript engine 607 may include LLMs to detect the presence of keywords in the ASR transcript.

The promotion engine 609 may be trained to detect price and/or promotion mentions within video content. In this regard, an LLM with prompt tuning/engineering may be used to detect textual attributes such as the presence of a special offer or mention of a price in the ASR transcript text.

The product/brand engine 611 may be trained to detect products, brands, entities, etc., within a video component. The product/brand engine 611 may include one or more multimodal transformer models that may receive, as input, pixel information of video frames and OCR text within a video component to determine the video content and provide responses to textual question inputs to identify visualized products and brands.

Engines 603-609, like engines 301-309 may be implemented as one or more computer programs, specially configured electronic circuitry or any combination thereof. Although FIG. 6 illustrates the CGS 601 as having five engines, the CGS 601 may have any number of engines. Moreover, the functionality of the engines described herein may be combined within one or more engines. Although engines 603-611 are all shown as being in a single CGS 601, the engines may be implemented in more than one CGS. Moreover, engines 603-611 may work in tandem and/or cooperatively.

The training data 620 can correspond to an artificial intelligence (AI) or machine learning (ML) task for analyze video components for compliance with industry practices. The training data 620 can be split into a training set, a validation set, and/or a testing set. The training data for the logo detection engine 603 can include examples of video frame or video components that include and do not include logos. The training data for the audio annotation engine 605 may include audio files, or video components including audio, that include and do not include music, voice, and other audio annotations. The training data for the audio transcript engine 607 may include transcript text including and not including keywords. The training data for the promotion engine 609 may include transcript text including and not including promotions, special offers, etc. The training data for the product/brand engine 611 may include video components or video frames including and not including products and brands.

From the inference data 630 and/or training data 620, the CGS 601 can be configured to output one or more results related to identified logos, audio annotations, mentions of brands, entities, products, etc., mentions of price and/or promotions, and products, brands, entities, etc., within the video component. Correspondingly, the AI or machine learning task can be a scoring, classification, and/or regression task for predicting some output given some input.

These AI or machine learning tasks can correspond to a variety of different applications in analyzing video components for compliance with industry practices. The output data 625 can include instructions associated with these tasks. For instance, the CGS 601 may be configured to provide the output data 625 as a set of computer-readable instructions, such as one or more computer programs, which can be executed by a computing device to provide feedback on how well a video component complies with industry practices. The CGS 601 can further be configured to forward the output data to one or more other devices configured for translating the output data into an executable program written in a computer programming language. The CGS 601 can also be configured to send the output data to a storage device for storage and later retrieval. Additionally, or alternatively, the video component evaluation tool may be configured to receive the output of the CGS 601 for further processing and/or implementation.

For instance, the video component evaluation tool may compare the output data 625 of the CGS 601 against a set of industry practices, to determine if the industry practices are met by the video component. The video component evaluation tool may provide an indication of which practices were met and/or which practices were missed. For instance, the video component evaluation tool may receive output data 625 indicating that a logo is not included in the video component. Based on this output data 625, the video component evaluation tool may recommend a logo be added to the video component. In some instances, the video component evaluation tool may provide recommendations for updating the video component to better satisfy the set of industry practices. The industry practices may be manually defined or generated by a model based on analysis of other video components by the CGS 601.

Figure 7:
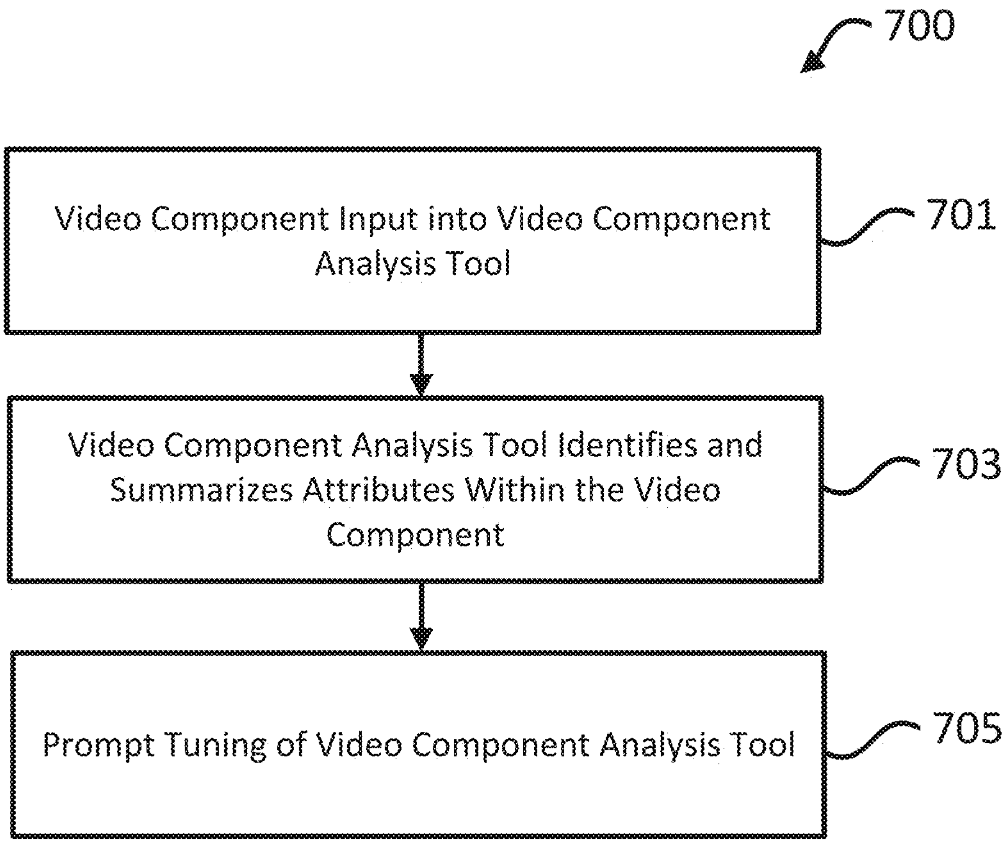
FIG. 7 is a flow diagram of an example process for analyzing a video component to identify attributes of the video component, in accordance with aspects of the disclosure.

FIG. 7 is a flow diagram illustrating the process 700 of the video component analysis tool analyzing video components to identify and summarize attributes of the video content for determining attributes associated with effectiveness of the video content. Identifying such attributes provides insights into what attributes should be included in video content to increase its effectiveness. The example process 700 can be performed, at least in part, on a system of one or more processors in one or more locations, such as servers 802 of FIG. 8. The following operations do not have to be performed in the precise order described below. Rather, various operations can be handled in a different order or simultaneously, and operations may be added or omitted.

As shown in block 701, the video component analysis tool may receive a video component for analysis. The video component provided to the video component analysis tool may be provided by, for example, a user selecting an available video component, or an upload of a video component being retrieved or input into the video component. The video component may include video and audio and/or an audio transcript.

As shown in block 703, the video component analysis tool may use a model, such as a generative AI model to analyze the video component to identify and summarize various attributes within the video component, such as content within the video and visual elements within the video. The summary of the content within the video may include labels and/or tags that describe what is shown in individual frames or collections of frames of the video and the summary of the visual elements may describe how the content is shown. The summary of the content may also include labels and/or tags that describe what is within the audio of the video corresponding to the frames or collections of the frames based on the audio and/or a transcript of the audio. The summary of the content within the video output by the model may include a summary of each frame, a collection of frames, and/or the entire video.

For instance, a video frame may illustrate a skateboarder in motion, with the video in black and white. The model of the video component analysis tool may label the video frame as including content related to a skateboarder. The model may further label the visual elements within the video frame as being in black and white and including motion. In another example, the video component analysis tool may label the duration, aspect ratio, and/or visual effects (e.g., motion blur, camera motion, cuts, etc.,) of the video content.

As shown in block 705, the identified and summarized attributes provided by the model may be tuned using prompts. In this regard, users may provide one or more prompts to the model of the video component analysis tool to refine the accuracy and quality of the attributes identified and summarized by the model. In this regard, the attributes identified and summarized by the model may be evaluated and the prompts continually refined until attributes that are of sufficient quality and accuracy are output by the model. In some instances, few-shot tuning may be employed to further optimize the quality of the attributes identified and summarized by the model. Although FIG. 7 illustrates block 705 occurring after block 703, block 705 may occur before or simultaneously with block 703.

The attributes identified and summarized by the model may be correlated with performance metrics using statistical methodologies. This correlation process helps in determining which attributes impact the effectiveness of the video content. For instance, which attributes the video content should include to increase sales, viewers, etc.

In some instances, the correlation findings may be validated. For example, video content both with and without the identified attributes may be generated, such as by a generative AI model or manually. Experiments may then be conducted to compare the performance of video content with identified attributes versus those without. The experimental results may be analyzed to identify attributes that positively and negatively affect performance of video content. Such identified attributes may then be included or excluded from future video content to increase the performance of the video content.

Figure 8:
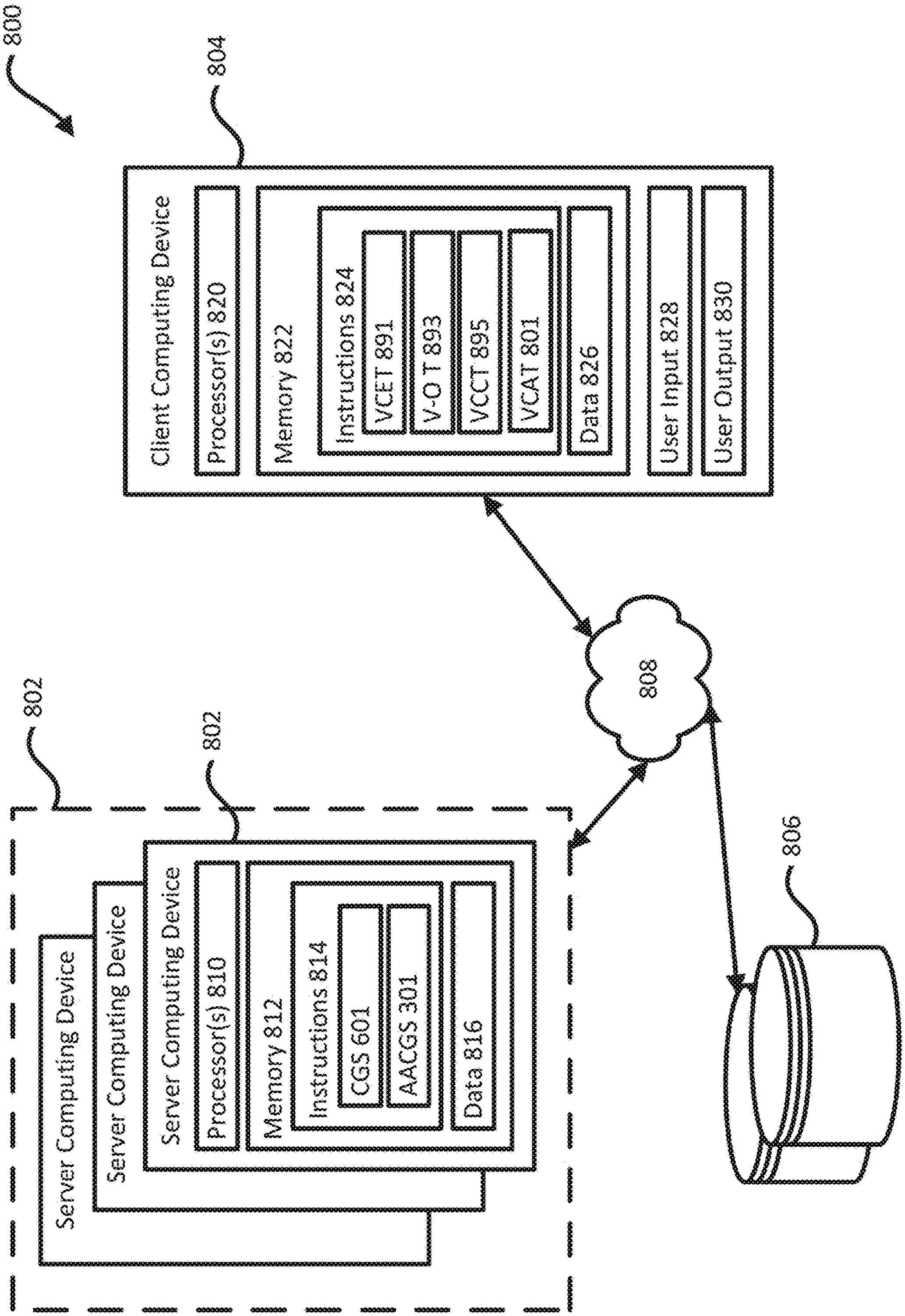
FIG. 8 is a block diagram of an example system for implementing aspects of the technology described herein.

FIG. 8 depicts a block diagram of an example environment 800 for implementing the systems and applications described herein including AACGS 301, CGS 601, models of the video component analysis tool 801, the video component evaluation tool 891, voice-over tool 893, and video component creation tool 895. The system 800 can be implemented on one or more computing devices having one or more processors in one or more locations, such as in server computing device 802 and client computing device 804. Client computing device 804 and the server computing device 802 can be communicatively coupled to one or more storage devices 806 over a network 808. The storage device 806 can be a combination of volatile and non-volatile memory and can be at the same or different physical locations than the computing devices 802, 804. For example, the storage devices 806 can include any type of non-transitory computer readable medium capable of storing information, such as a hard-drive, solid state drive, tape drive, optical storage, memory card, ROM, RAM, DVD, CD-ROM, write-capable, and read-only memories. The storage device 806 may store assets, video components, and other data discussed herein.

The server computing device 802 can include one or more processors 810 and memory 812. The memory 812 can store information accessible by the processors 810, including instructions 814 that can be executed by the processors 810. The memory 812 can also include data 816 that can be retrieved, manipulated, or stored by the processors 810. The memory 812 can be a type of non-transitory computer readable medium capable of storing information accessible by the processors 810, such as volatile and non-volatile memory. The processors 810 can include one or more central processing units (CPUs), graphic processing units (GPUs), field-programmable gate arrays (FPGAs), and/or application-specific integrated circuits (ASICs), such as tensor processing units (TPUs).

The instructions 814 can include one or more instructions that, when executed by the processors 810, cause the one or more processors to perform actions defined by the instructions 814. The instructions 814 can be stored in object code format for direct processing by the processors 810, or in other formats including interpretable scripts or collections of independent source code modules that are interpreted on demand or compiled in advance. Instructions 814 can include instructions for implementing a CGS 601, AACGS 301, and video component analysis tool. The CGS 601 and AACGS can be executed using the processors 810, and/or using other processors remotely located from the server computing device 802. Although the CGS 601 and AACGS 301 are shown as being executed by server computing device 802, the CGS 601 and AACGS 301 can be executed by a client computing device, such as client computing device 804.

The data 816 can be retrieved, stored, or modified by the processors 810 in accordance with the instructions 814. The data 816 can be stored in computer registers, in a relational or non-relational database as a table having a plurality of different fields and records, or as JSON, YAML, proto, or XML documents. The data 816 can also be formatted in a computer-readable format such as, but not limited to, binary values, ASCII, or Unicode. Moreover, the data 816 can include information sufficient to identify relevant information, such as numbers, descriptive text, proprietary codes, pointers, references to data stored in other memories, including other network locations, or information that is used by a function to calculate relevant data. For instance, the data may include training data, inference data, video components, assets, etc.

The client computing device 804 can be configured similarly to the server computing device 802, with one or more processors 820, memory 822, instructions 824 (such as the enterprise application, which may additionally or alternatively, be executed by the server computing device 802), and data 826. The client computing device 804 can also include a user input 828 and a user output 830. The user input 828 can include any appropriate mechanism or technique for receiving input from a user, such as keyboard, mouse, mechanical actuators, soft actuators, touchscreens, microphones, and sensors.

The server computing device 802 and client computing device 804 can be configured to transmit and receive data to and from each other device. In some instances, the client computing device 804 can be configured to display at least a portion of the received data from the server computing device 802, on a display implemented as part of the user output 830. The user output 830 can also be used for displaying an interface between the client computing device 804 and the server computing device 802. The user output 830 can alternatively or additionally include one or more speakers, transducers, or other audio outputs, a haptic interface or other tactile feedback that provides non-visual and non-audible information to the platform user of the client computing device 804.

Although FIG. 8 illustrates the processors 810, 820 and the memories 812, 822 as being within the computing devices 802, 804, components described herein can include multiple processors and memories that can operate in different physical locations and not within the same computing device. For example, some of the instructions 814, 824 and the data 816, 826 can be stored on a removable SD card and others within a read-only computer chip. Some or all of the instructions and data can be stored in a location physically remote from, yet still accessible by, the processors 810, 820. Similarly, the processors 810, 820 can include a collection of processors that can perform concurrent and/or sequential operation. The computing devices 802, 804 can each include one or more internal clocks providing timing information, which can be used for time measurement for operations and programs run by the computing devices 802, 804.

The server computing device 802 can be connected over the network 808 to a datacenter (not shown) housing any number of hardware accelerators. The datacenter can be one of multiple datacenters or other facilities in which various types of computing devices, such as hardware accelerators, are located. Computing resources housed in the datacenter can be specified for deploying models, such as the engines described herein.

The server computing device 802 can be configured to receive requests to process data from the client computing device 804 on computing resources in the datacenter. For example, the environment 800 can be part of a computing platform configured to provide a variety of services to users, through various user interfaces and/or application programming interfaces (APIs) exposing the platform services. The variety of services can include creating, enhancing, and analyzing video components. In one example, the client computing device 804 can, using the VCET 891, V-O T 893, VCAT 801, or VCCT 895, transmit data specifying requests for services. The server computing system 802 can receive the request, and in response, use one or more models, such as generative AI models, CGS 601, and/or AACGS 301 to generate a response.

Figure 9:
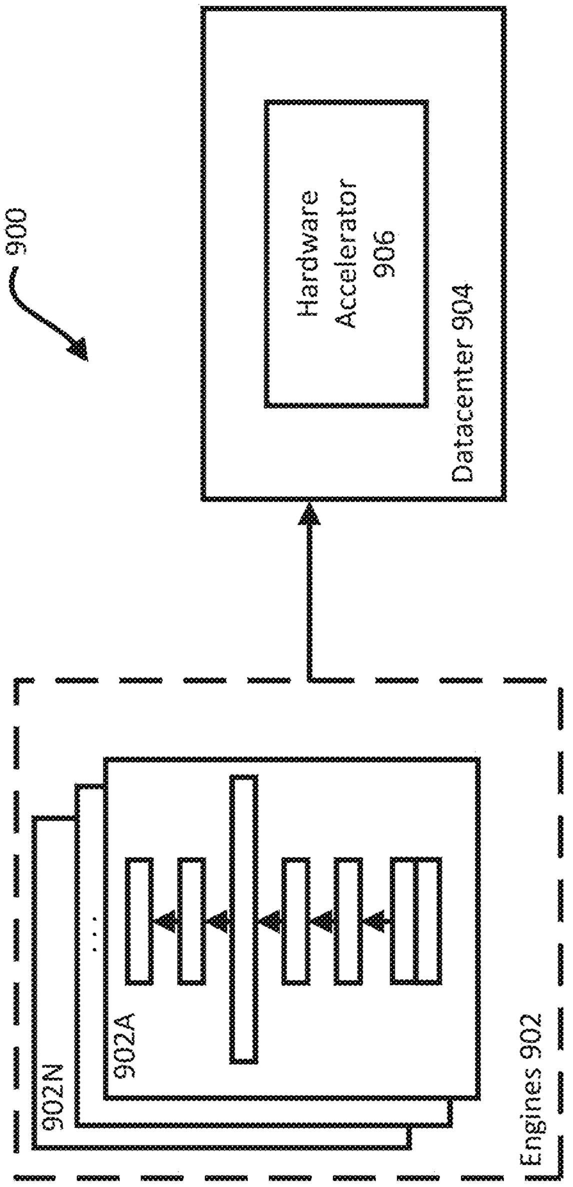
FIG. 9 is a block diagram of an example environment for implementing engines within a datacenter, according to aspects of the disclosure.

FIG. 9 depicts a block diagram 900 illustrating one or more engine architectures 902, more specifically 902A-N for each architecture, for deployment in a datacenter 904 housing a hardware accelerator 906 on which the deployed engines 902 will execute. The hardware accelerator 906 can be any type of processor, such as a CPU, GPU, FPGA, or ASIC such as a TPU.

An architecture 902 of an engine can refer to characteristics defining the engine, such as characteristics of layers for the models, how the layers process input, or how the layers interact with one another. The architecture 902 of the engine can also define types of operations performed within each layer. One or more architectures 902 can be generated that can output results.

Referring back to FIG. 8, the computing devices 802, 804, and the datacenter can be capable of direct and indirect communication over the network 808. For example, using a network socket, the client computing device 804 can connect to a service operating in the datacenter through an Internet protocol. The computing devices 802, 804 can set up listening sockets that may accept an initiating connection for sending and receiving information. The network 808 itself can include various configurations and protocols including the Internet, World Wide Web, intranets, virtual private networks, wide area networks, local networks, and private networks using communication protocols proprietary to one or more companies. The network 808 can support a variety of short- and long-range connections. The short- and long-range connections may be made over different bandwidths, such as 2.402 GHz to 2.480 GHZ, commonly associated with the Bluetooth® standard, 2.4 GHz and 5 GHZ, commonly associated with the Wi-Fi® communication protocol; or with a variety of communication standards, such as the LTER standard for wireless broadband communication. The network 808, in addition or alternatively, can also support wired connections between the computing devices 802, 804 and the datacenter, including over various types of Ethernet connections.

Although a single client computing device 804 is shown in FIG. 8, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing engines, and any combination thereof.

Aspects of this disclosure can be implemented in digital electronic circuitry, in tangibly-embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed on it software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" refers to data processing hardware and encompasses various apparatus, devices, and machines for processing data, including programmable processors, computers, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The data processing apparatus can include special-purpose hardware accelerator units for implementing machine learning models to process common and compute-intensive parts of machine learning training or production, such as inference or workloads. Machine learning models can be implemented and deployed using one or more machine learning frameworks, such as a TensorFlow framework, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a stand-alone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purposes logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back-end component, e.g., as a data server, a middleware component, e.g., an application server, or a front-end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A method for assessing a video component comprising:

receiving, by one or more processors, the video component;

evaluating, by the one or more processors, using a multimodal video component evaluation tool, the received video component relative to audio and video metrics, the evaluation comparing attributes within the video component to the audio and video metrics to determine whether each of the audio and video metrics are met by the received video component, wherein the multimodal video component evaluation tool comprises a product/brand engine configured to:

receive as input, pixel information corresponding to individual video frames of the received video component, and process, using a pixel-level image models, the pixel information by matching objects identified in the individual video frames to a taxonomy of brands and/or products to identify brands and/or products within the video component;

generating, by the one or more processors, based on the evaluation, a result indicating that one or more of the audio and video metrics are not met, wherein the result comprises an indication that the product/brand engine did not detect a particular brand and/or product;

generating, by a generative artificial intelligence (AI) model, content representing the particular brand and/or product based on the result;

integrating, by the generative AI model, the generated content representing the particular brand and/or product into the video component; and outputting, by the one or more processors, the video component including the particular brand and/or product.

2. The method of claim 1, wherein the multimodal video component evaluation tool further comprises a logo detection engine configured to detect logos within the video component and the result comprises an indication of whether the logo detection engine detects one or more logos.

3. The method of claim 1, wherein the multimodal video component evaluation tool further comprises an audio annotation engine configured to detect audio annotations within an audio track of the video component and the result comprises an indication of whether the audio annotation engine detects one or more predefined audio annotations comprising pieces of music or speech, lengths of music or speech, or music or speech having a particular volume.

4. The method of claim 1, wherein the multimodal video component evaluation tool further comprises an audio transcript engine configured to detect keywords from a taxonomy based on a transcript of an audio track of the video component and the result comprises an indication of whether the audio transcript engine detects one or more brands and/or products within audio of the video component.

5. The method of claim 1, wherein the multimodal video component evaluation tool further comprises a promotion engine configured to detect promotions within a transcript of an audio track of the video component and the result comprises an indication of whether the promotion engine detects one or more promotions within the transcript.

6. The method of claim 1, further comprising:

identifying, by the one or more processors, the attributes within the video component; and summarizing, by the one or more processors, the attributes within the video component.

7. The method of claim 1, wherein the attributes within the video component comprise one or more of content within the received video component or one or more visual elements within the received video component.

8. The method of claim 1, wherein the attributes within the video component comprise one or more visual elements within the received video component, the one or more visual elements comprising at least one of duration of received video content, aspect ratio of received video content, or visual effects within received video content.

9. A system comprising:

one or more processors configured to:

receive a video component;

evaluate, using a multimodal video component evaluation tool, the received video component relative to audio and video metrics, the evaluation comparing attributes within the video component to the audio and video metrics to determine whether each of the audio and video metrics are met by the received video component, wherein the multimodal video component evaluation tool comprises a product/brand engine configured to:

receive as input, pixel information corresponding to individual video frames of the received video component, and process, using a pixel-level image models, the pixel information by matching objects identified in the individual video frames to a taxonomy of brands and/or products to identify brands and/or products within the video component;

generate, based on the evaluation, a result indicating that one or more of the audio and video metrics are not met, wherein the result comprises an indication that the product/brand engine did not detect a particular brand and/or product;

generate, by a generative artificial intelligence (AI) model, content representing the particular brand and/or product based on the result;

integrate, by the generative AI model, the generated content representing the particular brand and/or product into the video component; and output the video component including the particular brand and/or product.

10. The system of claim 9, wherein the multimodal video component evaluation tool further comprises a logo detection engine configured to detect logos within the video component and the result comprises an indication of whether the logo detection engine detects one or more logos.

11. The system of claim 9, wherein the multimodal video component evaluation tool further comprises an audio annotation engine configured to detect audio annotations within an audio track of the video component and the result comprises an indication of whether the audio annotation engine detects one or more predefined audio annotations comprising pieces of music or speech, lengths of music or speech, or music or speech having a particular volume.

12. The system of claim 9, wherein the multimodal video component evaluation tool further comprises an audio transcript engine configured to detect keywords from a taxonomy based on a transcript of an audio track of the video component and the result comprises an indication of whether the audio transcript engine detects one or more brands and/or products within audio of the video component.

13. The system of claim 9, wherein the multimodal video component evaluation tool further comprises a promotion engine is configured to detect promotions within a transcript of an audio track of the video component and the result comprises an indication of whether the promotion engine detects one or more promotions within the transcript.

14. The system of claim 9, wherein the one or more processors are further programmed to:

identify the attributes within the video component; and summarize the attributes within the video component.

15. The system of claim 9, wherein the attributes within the video component comprise one or more of content within the received video component or one or more visual elements within the received video component.

16. The system of claim 9, wherein the attributes within the video component comprise one or more visual elements within the received video component, the one or more visual elements comprising at least one of duration of received video content, aspect ratio of received video content, or visual effects within received video content.

17. A non-transitory computer readable medium storing instructions that, when executed by one or more processors, cause the one or more processors to:

receive a video component;

evaluate, using a multimodal video component evaluation tool, the received video component relative to audio and video metrics, the evaluation comparing attributes within the video component to the audio and video metrics to determine whether each of the audio and video metrics are met by the received video component, wherein the multimodal video component evaluation tool comprises a product/brand engine configured to:

receive as input, pixel information corresponding to individual video frames of the received video component, and process, using a pixel-level image models, the pixel information by matching objects identified in the individual video frames to a taxonomy of brands and/or products to identify brands and/or products within the video component;

generate, based on the evaluation, a result indicating that one or more of the audio and video metrics are not met, wherein the result comprises an indication that the product/brand engine did not detect a particular brand and/or product;

generate, by a generative artificial intelligence (AI) model, content representing the particular brand and/or product based on the result;

add, by the generative AI model, the generated content representing the particular brand and/or product to the video component; and output the video component including the particular brand and/or product.

18. The non-transitory computer readable medium of claim 17, wherein the multimodal video component evaluation tool further comprises a logo detection engine configured to detect logos within the video component and the result comprises an indication of whether the logo detection engine detects one or more logos.

19. The non-transitory computer readable medium of claim 17, wherein the multimodal video component evaluation tool further comprises an audio annotation engine configured to detect audio annotations within an audio track of the video component and the result comprises an indication of whether the audio annotation engine detects one or more predefined audio annotations comprising pieces of music or speech, lengths of music or speech, or music or speech having a particular volume.

20. The non-transitory computer readable medium of claim 17, wherein the multimodal video component evaluation tool further comprises:

an audio transcript engine configured to detect keywords from a taxonomy based on a transcript of an audio track of the video component and the result comprises an indication of whether the audio transcript engine detects one or more brands and/or products within the transcript; and a promotion engine is configured to detect promotions within the transcript and the result comprises an indication of whether the promotion engine detects one or more promotions within the transcript.

* * * * *